March 18, 1941.  K. KUMETAT ET AL  2,235,027

PHOTOGRAPHIC SENSITIZER

Filed Oct. 6, 1939

Fig. 1. DYESTUFF DERIVED FROM 1.2-DIMETHYL-3-ACETOXY-PROPYL-6-CHLOROBENZIMIDAZOLIUM-METHYLSULFATE AND 1.1.3.6-TETRAMETHYL-INDOLINE-2-METHINE-ω-ALDEHYDE.

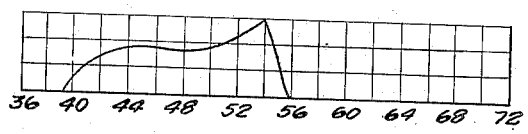

Fig. 2. DYESTUFF DERIVED FROM 1-ETHYL-2-METHYL-3-ACETOXYPROPYL-6-CHLOROBENZIMIDAZOLIUMETHYLSULFATE AND N-METHYL-THIAZOLINE-2-METHINE-ω-ALDEHYDE.

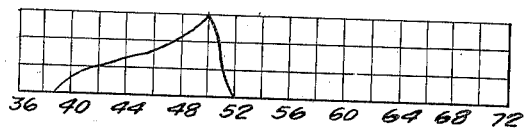

Fig. 3. DYESTUFF DERIVED FROM 1-ETHYL-2-METHYL-3-ACETOXYPROPYL-6-CHLOROBENZIMIDAZOLIUM-ETHYLSULFATE AND N-ETHYL-BENZSELENAZOLE-2-METHINE-ω-ALDEHYDE.

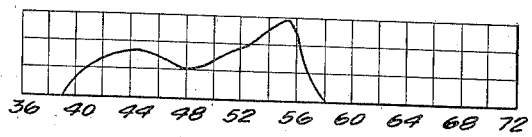

Fig. 4. DYESTUFF DERIVED FROM 1-ETHYL-2-METHYL-3-ACETOXYPROPYL-6-CHLORO-BENZIMIDAZOLIUM-ETHYLSULFATE AND 1.1.3.6-TETRAMETHYLINDOLINE-2-METHINE-ω-ALDEHYDE.

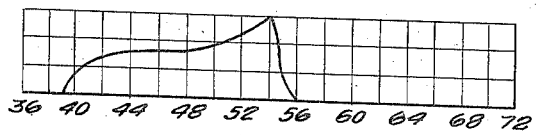

INVENTORS
KARL KUMETAT
GUSTAV WILMANNS
BY
THEIR ATTORNEYS

Patented Mar. 18, 1941

2,235,027

UNITED STATES PATENT OFFICE 2,235,027

PHOTOGRAPHIC SENSITIZER

Karl Kumetat and Gustav Wilmanns, Wolfen, Kreis Bitterfeld, Germany, assignors, by mesne assignments, to General Aniline & Film Corporation, New York, N. Y., a corporation of Delaware Application October 6, 1939, Serial No. 298,258
In Germany October 12, 1938

1 Claim. (Cl. 95—7)

Our present invention relates to a new and useful method of manufacturing silver halide emulsions and provides a new class of cyanine dyestuffs suitable for sensitizing said emulsions.

In the U. S. patent application Ser. No. 234,604 filed October 12, 1938, there is described a process to apply for sensitizing photographic silver halide emulsions trimethinecyanine dyestuffs which on one or both ends of the trimethylene chain contain the benzimidazole nucleus.

In further investigation of this process it has been found that those dyestuffs of the said group in which the nitrogen atom in 3-position of the benzimidazole nucleus has been substituted by an acetylated hydroxyalkyl group present especial advantages.

The figures of the accompanying drawing are self-explanatory. Figures 1, 2, 3 and 4 show sensitivity curves of emulsions treated with the dyestuffs named in Examples 1, 2, 4 and 7 respectively.

The following examples show the constitution and the sensitizing qualities of the said class of dyestuffs.

Example 1

The dyestuff derived from 1.1.3-trimethylindoline-2-methine-ω-aldehyde and 1-ethyl-2-methyl-3-acetoxypropyl-6-chlorobenzimidazole-ethylsulfate has the following constitution:

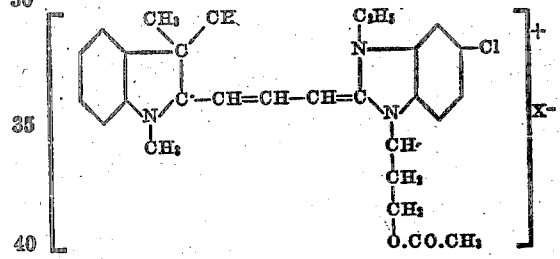

and sensitizes up to 570 mµ with a maximum at 545 mµ.

Example 2

The dyestuff derived from N-methyl-thiazoline-2-methine-ω-aldehyde and 1-ethyl-2-methyl-3-acetoxypropyl-6-chlorobenzimidazoliumethylsulfate has the following formula:

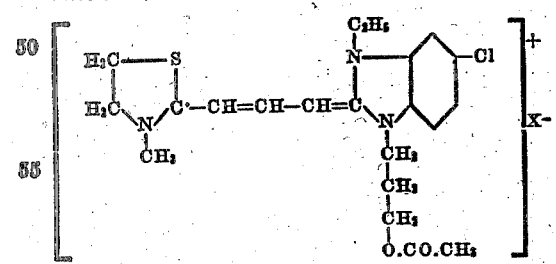

and sensitizes with a maximum at 503 mµ.

Example 3

The dyestuff derived from 1.2-dimethyl-3-acetoxypropyl - 6 - chlorobenzimidazoliumsulfate and N - ethyl - benzselenazole-2-methine-ω-aldehyde has the following formula:

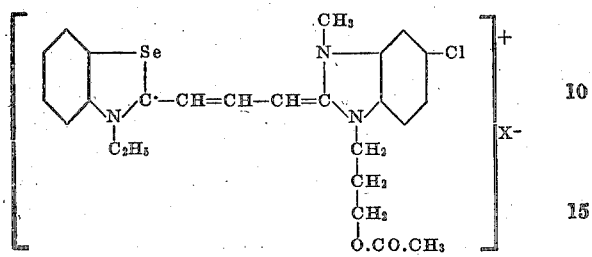

and sensitizes with a maximum at 555 mµ up to 590 mµ.

Example 4

The dyestuff derived from 1-ethyl-2-methyl-3-acetoxypropyl-6-chloro-benzimidazolium-ethylsulfate and N-ethyl-benzselenazole-2-methine-ω-aldehyde has the following formula:

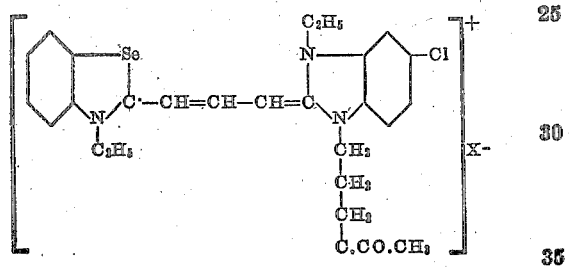

and sensitizes up to 590 mµ with a maximum at 555 mµ.

Example 5

The dyestuff derived from 1-ethyl-2-methyl-3-acetoxypropyl - benzimidazole - ethylsulfate and 1.1.3 - trimethylindoline - 2 - methine-ω-aldehyde has the following formula:

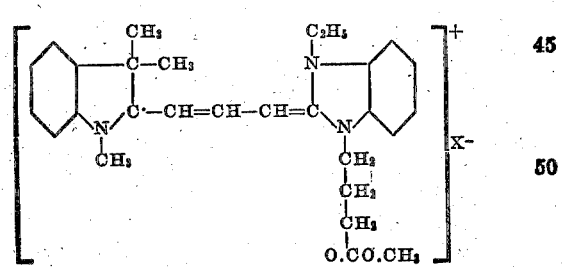

and sensitizes up to 550 mµ with a maximum at 528 mµ.

Example 6

The dyestuff derived from 1-ethyl-2-methyl-3-acetoxypropyl - benzimidazolium - ethylsulfate and N-ethyl-thiazoline - 2 - methine-ω-aldehyde has the following formula:

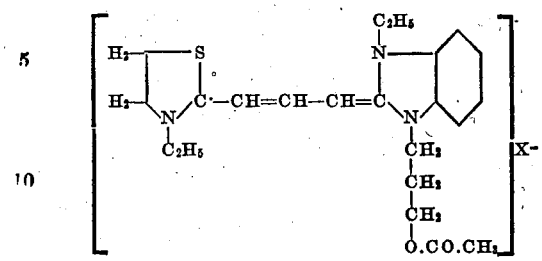

and sensitizes from 450 mμ to 510 mμ with a maximum at 493 mμ.

Example 7

The dyestuff derived from 1-ethyl-2-methyl-3-acetoxypropyl - 6 - chloro - benzimidazolium-ethylsulfate and 1.1.3.6-tetramethylindoline-2-methine-ω-aldehyde has the following formula:

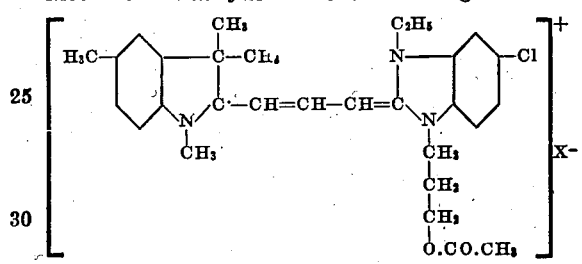

and sensitizes up to 575 mμ with a maximum at 540 mμ.

Example 8

The dyestuff derived from 1-ethyl-2-methyl-3-acetoxypropyl - 6 - chloro - benzimidazolium-ethylsulfate and 1.1.3-trimethyl-6-methoxy-indoline-2-methine-ω-aldehyde has the following formula:

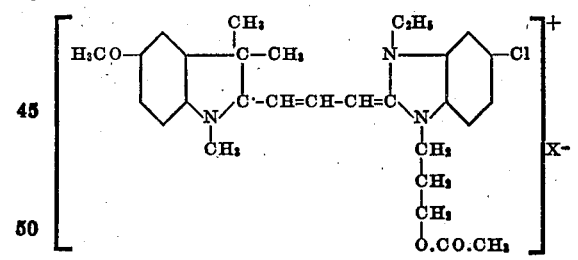

and sensitizes up to 585 mμ with a maximum at 550 mμ.

Example 9

The dyestuff derived from 1.2-dimethyl-3-acetoxypropyl-6-chloro - benzimidazolium-methylsulfate and N-ethyl-thiazoline-2-methine-ω-aldehyde has the following formula:

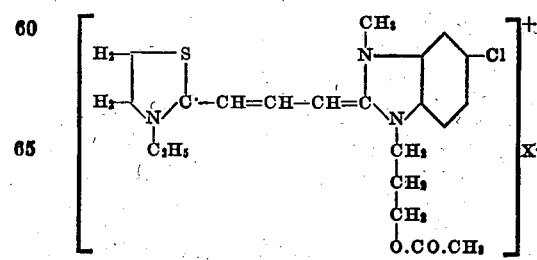

and sensitizes from 450 mμ to 520 mμ with a maximum at 498 mμ.

Example 10

The dyestuff derived from 1-ethyl-2-methyl-3-acetoxyethyl - 6 - chloro - benzimidazolium-ethylsulfate and N-ethyl-thiazoline-2-methine-ω-aldehyde has the following formula:

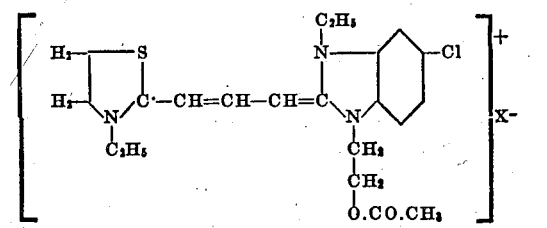

and sensitizes from 450 mμ to 520 mμ with a maximum at 498 mμ.

Example 11

The dyestuff derived from 1.2-dimethyl-3-acetoxyethyl-6-chloro - benzimidazolium-methylsulfate and N-ethyl-thiazoline-2-methine-ω-aldehyde has the following formula:

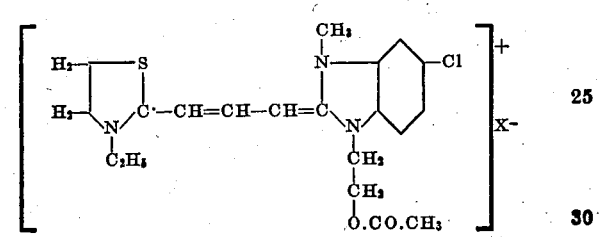

and sensitizes from 450 mμ to 520 mμ with a maximum at 498 mμ.

Example 12

The dyestuff derived from 1-ethyl-2-methyl-3-acetoxyethyl - 6 - chloro - benzimidazolium-ethylsulfate and N-methyl-thiazoline-2-methine-ω-aldehyde has the following formula:

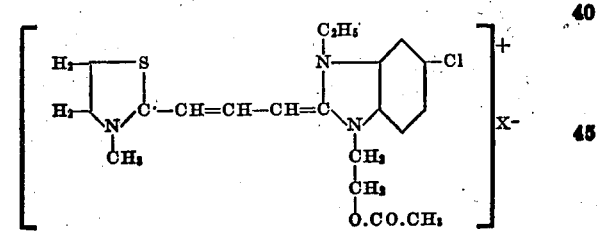

and sensitizes from 450 mμ to 520 mμ with a maximum at 498 mμ.

Example 13

The dyestuff derived from 1-ethyl-2-methyl-3-acetoxypropyl-4-chloro-benzimidazolium - ethylsulfate and 1.1.3-trimethyl-indoline-2-methine-ω-aldehyde has the following formula:

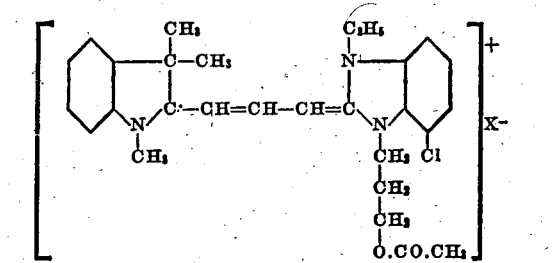

and sensitizes up to 560 mμ with a maximum at 530 mμ.

Example 14

The dyestuff derived from 1.2 - dimethyl - 3 - acetoxypropyl-4-chloro-benzimidazolium - methylsulfate and N-ethyl-thiazoline - 2 - methine-ω-aldehyde has the following formula:

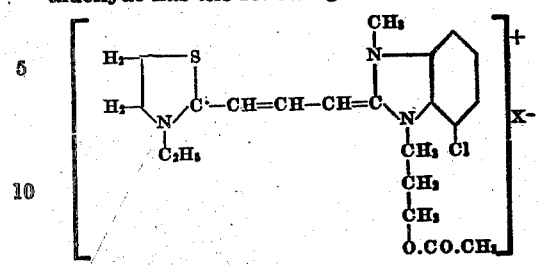

and sensitizes from 450 to 510 mμ with a maximum at 493 mμ.

Example 15

The dyestuff derived from 1.2 - dimethyl - 3 - acetoxypropyl-6-chloro-benzimidazolium - methylsulfate and 1.1.3 - 6 - tetramethyl-indoline - 2 - methine-ω-aldehyde has the following formula:

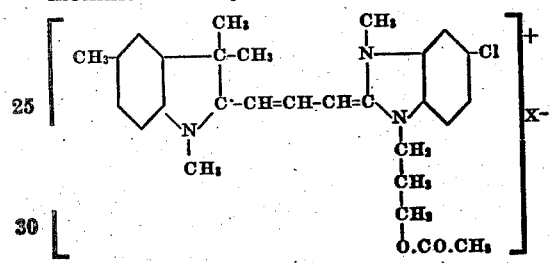

and sensitizes up to 575 mμ with a maximum at 540 mμ.

Example 16

The dyestuff derived from 1.2 - dimethyl - 3 - acetoxypropyl - benzimidazoleum - methylsulfate and N-ethyl-thiazoline - 2 - methine-ω-aldehyde has the following formula:

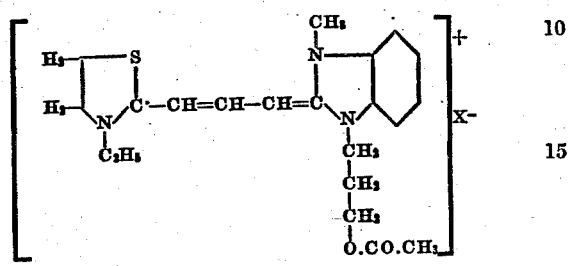

and sensitizes with a maximum at 493 mμ from 450 to 520 mμ.

We claim:
A photographic gelatino silver halide emulsion containing a benzimidazole trimethinecyanine dyestuff, in which one nitrogen atom of the benzimidazole nucleus has an acetylated hydroxyalkyl group attached thereto.

KARL KUMETAT.
GUSTAV WILMANNS.